United States Patent [19]

Nagaba

[11] Patent Number: 4,831,296

[45] Date of Patent: May 16, 1989

[54] ROTARY DEVICE

[76] Inventor: Koichi Nagaba, 3514 Nagaba, Toyosaka-shi, Niigata-ken, Japan

[21] Appl. No.: 240,424

[22] Filed: Sep. 1, 1988

Related U.S. Application Data

[63] Continuation of Ser. No. 943,621, Dec. 18, 1986, abandoned.

[30] Foreign Application Priority Data

May 12, 1986 [JP] Japan .................................. 61-71576
Sep. 1, 1986 [JP] Japan ................................. 61-205579

[51] Int. Cl.⁴ ........................................... H02K 16/02
[52] U.S. Cl. ...................................... 310/86; 310/114
[58] Field of Search ....................... 310/46, 80, 85, 86, 310/103, 114, 115, 118

[56] References Cited

U.S. PATENT DOCUMENTS

| | | | |
|---|---|---|---|
| 1,889,208 | 11/1932 | Masterson et al. | 310/118 X |
| 3,443,137 | 5/1969 | McElray | 310/259 |
| 3,703,653 | 11/1972 | Tracy et al. | 310/103 X |
| 3,935,487 | 1/1976 | Czerniak | 310/46 |
| 4,038,572 | 7/1977 | Hanagau | 310/103 X |
| 4,612,470 | 9/1986 | Smith, Jr. et al. | 310/273 |
| 4,719,380 | 1/1988 | Smith, Jr. et al. | 310/114 |

Primary Examiner—Peter S. Wong
Assistant Examiner—Judson H. Jones
Attorney, Agent, or Firm—Steele, Gould & Fried

[57] ABSTRACT

A rotary device comprises: a rotor; a plurality of magnetic poles distributed at angular intervals on the circumference of the rotor; a stator encircling the rotor; a plurality of magnetic poles disposed at angular intervals on the inner circumference of the stator; rotary magnetic shielding member disposed between the rotor and the stator so as to encircle the rotor and provided with magnetic paths distributed at angular intervals on the circumferential wall thereof encircling the rotor; and a synchronizing mechanism interlocking the rotor and the rotary magnetic shielding member so that the magnetic shielding member is rotated in synchronism with the rotor. The attractive force or the repulsive force acting between the magnetic poles of the rotor and the corresponding magnetic poles of the stator is varied by the magnetic shielding member so that the rotor is rotated continuously in one direction by the attractive force or the repulsive force.

4 Claims, 1 Drawing Sheet

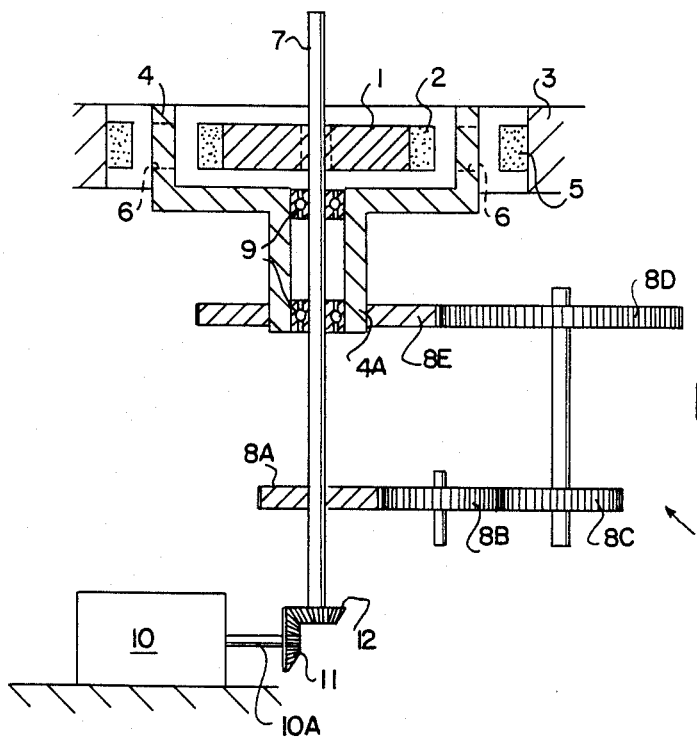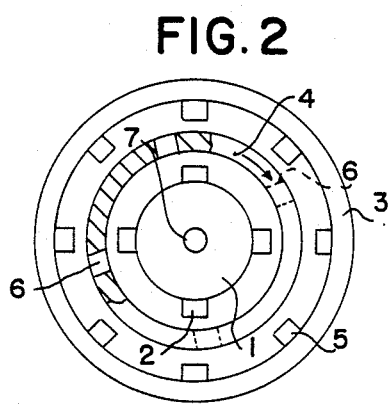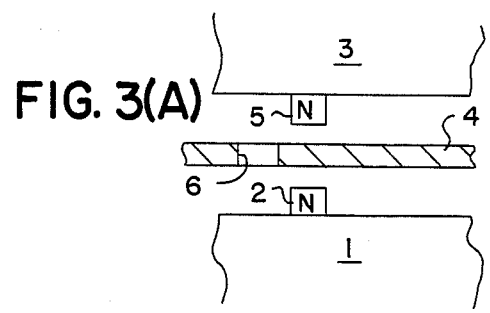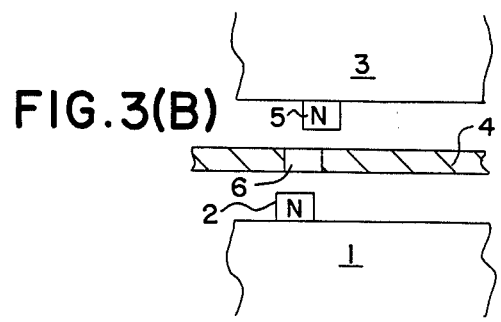

ROTARY DEVICE

CROSS REFERENCE TO RELATED APPLICATION

This is a continuation of application Ser. No. 943,621, filed Dec. 18, 1986, now abandoned.

BACKGROUND OF THE INVENTION

1. Field of the Invention

The present invention relates to a rotary device having a stator and a rotor each having magnetic poles for producing rotary force.

2. Description of the Prior Art

A shading coil motor, namely, a rotary device utilizing the variation of magnetic flux in a core for producing rotary force, incorporating "Laminations and Magnetic Core for Motor Stators and Transformers" disclosed in U.S. Pat. No. 3,443,137 is known. This known motor comprises a stator core having a pair of legs, a yoke mounted with a coil and disposed between the pair of legs of the stator core, and a pair of shading coils provided on one side of the leg of the stator core. In such a motor provided with a pair of shading coils on one side of the leg of the stator core, the leakage of magnetic flux occurs in or in the vicinity of the surface between the shading coils of the stator core, which reduces the efficiency of the motor.

SUMMARY OF THE INVENTION

Accordingly, it is an object of the present invention to provide a rotary device eliminated of the foregoing problems, and capable of efficiently producing rotative force by varying the magnetic repulsive force acting between the rotor and the stator.

BRIEF DESCRIPTION OF THE DRAWINGS

FIG. 1 is a longitudinal sectional view of a rotary device, in a preferred embodiment, according to the present invention;

FIG. 2 is a partially cutaway top plan view of the rotary device of FIG. 1; and

FIGS. 3A and 3B are partially cutaway fragmentary top plan views of the rotary device of FIG. 1, of assistance in explaining the principle of operation of the rotary device.

DESCRIPTION OF THE PREFERRED EMBODIMENT

Referring to FIG. 1, a rotary device embodying the present invention has a rotor 1 provided with rotor magnetic poles 2 of N-polarity at regular angular intervals on the circumference thereof, and a stator 3 encircling the rotor 1 with a magnetic shielding member 4 therebetween. Stator magnetic poles of N-polarity are provided at regular angular intervals on the inner circumference of the stator 3. The magnetic shielding member 4 is formed of a material having a high magnetic permeability, and is provided with through holes 6 which serve as magnetic paths for making the magnetic shielding effect of the magnetic shielding member 4 unavailable when the radial center lines of the rotor magnetic poles 2 are shifted relative to the radial center lines of the stator magnetic poles 5 in a circumferential direction.

A driving shaft 7 is fixed to the center of the rotor 1 so as to extend perpendicularly to a plane including the rotor 1. The driving shaft 7 and the magnetic shielding member 4 are interlocked by a synchronizing mechanism 8. The synchronizing mechanism 8 comprises a first gear 8A fixed to the lower part of the driving shaft 7, a second gear 8B engaging the first gear 8A, a third gear 8C engaging the second gear 8B, a fourth gear 8D coaxially fixed to a shaft fixed to the third gear 8C, and a fifth gear 8E engaging the fourth gear 8D. The magnetic shielding member 4 is supported rotatably on the driving shaft 7 on bearings 9 provided in the boss 4A thereof. The fifth gear 8E is fixed to the boss 4A of the magnetic shielding member 4. Indicated at 10 is a power generator. A driving gear 12 is fixed to the lower end of the driving shaft 7, and a driven gear 11 engaging the driving gear 12 is fixed to the free end of the input shaft 10A of the power generator 10.

The manner of operation of the rotary device thus constituted will be described hereinafter with reference to FIGS. 3A and 3B.

As illustrated in FIG. 3A, when the rotor magnetic poles 2 are located opposite to the stator magnetic poles 5, the rotor is turned through a small angle by a repulsive force acting between the corresponding rotor magnetic poles 2 and the stator magnetic poles 5, so that the respective radial center lines of the rotor magnetic poles 2 are shifted from the corresponding radial center lines of the stator magnetic poles 5, and thereby the magnetic shielding member 4 is turned in the opposite direction through the synchronizing mechanism 8 by the driving shaft 7. Consequently, each through hole 6 is located between the rotor magnetic pole 2 and the corresponding stator magnetic pole 5, and thereby the repulsive force acting between the rotor magnetic pole 2 and the corresponding stator magnetic pole 5 is enhanced to turn the driving shaft 7 further in the same direction.

According to the Coulomb's law, the repulsive force acting between the magnetic poles 2 and 5 is expressed by:

$$F = \frac{m_1 \cdot m_2}{4\pi\mu r^2}$$

where F is the repulsive force acting between the magnetic poles 2 and 5, $m_1$ is the magnetic force of the rotor magnetic pole 2, $m_2$ is the magnetic force of the stator magnetic pole 5, $\mu$ is the magnetic permeability, and r is the distance between the magnetic poles 2 and 5. When the through hole 6 is located between the rotor magnetic pole 2 and the stator magnetic pole 5, the magnetic permeability $\mu$ is small, and hence the repulsive force F becomes large. On the contrary, when the circumferential wall of the magnetic shielding member 4 having a large magnetic permeability comes between the rotor magnetic pole 2 and the stator magnetic pole 5 as the magnetic shielding member 4 is turned by the driving shaft 7, the magnetic permeability $\mu$ becomes large, and hence the repulsive force F acting against the force of inertia of the rotor 1 becomes small. When the through hole 6 comes between the magnetic poles 2 and 5 again, the repulsive force acts between the magnetic poles 2 and 5, so that the driving shaft 7 continues rotation. The rotative force of the rotor 1 is transmitted through the driving gear 12 and the driven gear 11 to the input shaft 10A of the power generator 10 for power generation.

Thus, the magnetic shielding member 4 having the through holes 6 and disposed between the rotor 1 and the stator 3 regulates the repulsive force acting between the rotor magnetic poles 2 and the stator magnetic poles 5 so that the driving shaft is driven for rotation by the repulsive force.

The magnetic shielding member 4 disposed between the rotor 1 and the stator 3 is driven through the synchronizing mechanism 8 by the driving shaft so that the through holes 6 are located properly between the rotor magnetic poles 2 and the corresponding stator magnetic poles 5. Consequently, the magnetic permeability $\mu$ of the magnetic field in the vicinity of the rotor magnetic poles 2 and the corresponding stator magnetic poles 5 varies periodically, and sinusoidal repulsive force F is produced between the rotor magnetic poles 2 and the corresponding stator magnetic poles 5.

Since the rotor 1, the stator 3 and the magnetic shielding member 4 are isolated from each other and no frictional resistance acts between those components, the rotor 1 rotates efficiently.

The respective magnetic polarities of the rotor magnetic poles 2 and the stator magnetic poles 5 need not necessarily be N-polarities; the respective magnetic polarities of the rotor magnetic poles 2 and the stator magnetic poles 5 may be S-polarities, N-polarity and S-polarity, or S-polarity and N-polarity, respectively. The synchronizing mechanism 8 may be substituted by any suitable mechanism such as a belt-and-pulley mechanism. Furthermore, the number of the magnetic poles of the rotor is not limited, and the angular intervals of the magnetic poles of the multiple rotors 1 and stators connected to the driving shaft 7 may be slightly different from each other.

Although the invention has been described in its preferred form with a certain degree of particularity, it is to be understood that many variations and changes are possible in the invention without departing from the scope thereof.

What is claimed is:

1. A rotary device, comprising: a rotatable driving shaft;

a rotor fixed to the driving shaft, a plurality of rotor magnetic poles being spaced about a circumference of the rotor, the rotor magnetic poles causing a periodic time-varying magnetic flux around the rotor when the driving shaft is rotated;

a stator encircling the rotor, a plurality of stator magnetic poles being spaced about an inner circumference of the stator, the stator magnetic poles defining a varying magnetic flux at angular intervals around the stator;

a rotatable magnetic shielding member disposed between the rotor and stator so as to encircle the rotor, and provide magnetic paths between the rotor magnetic poles and the stator magnetic poles, of magnetic permeability varying at angular intervals around the magnetic shielding member; and, a synchronizing mechanism coupled to said driving shaft and to the magnetic shielding member, the synchronizing mechanism rotatably driving the magnetic shielding member in synchronism with and in an opposite direction with respect to the rotor, the magnetic shielding member providing a periodic variation in permeability between the rotor magnetic poles and the stator magnetic poles corresponding to said magnetic paths, while rotating in a direction opposite to the rotor, for shading said rotor magnetic poles and stator magnetic poles relative to one another.

2. A rotary device as recited in claim 1, wherein said rotor magnetic poles and said stator magnetic poles are the same in magnetic polarity.

3. A rotary device as recited in claim 1, wherein said rotor magnetic poles and said stator magnetic poles are different in magnetic polarity.

4. The rotary device of claim 1 wherein the magnetic shielding member is formed of a material having a high magnetic permeability and is provided with through holes.

* * * * *